United States Patent [19]

Salloga et al.

[11] 3,854,697
[45] Dec. 17, 1974

[54] DOUBLE DISC GATE VALVE

[75] Inventors: Fred W. Salloga; Charles R. Burger, both of Chattanooga, Tenn.

[73] Assignee: United States Pipe and Foundry Company, Birmingham, Ala.

[22] Filed: Jan. 31, 1974

[21] Appl. No.: 438,376

[52] U.S. Cl................ 251/167, 251/197, 251/199
[51] Int. Cl............................................. F16k 3/10
[58] Field of Search .......... 251/167, 168, 197, 198

[56] References Cited
UNITED STATES PATENTS

| 922,636 | 5/1909 | Smith | 251/199 |
|---|---|---|---|
| 1,476,862 | 12/1923 | Wagner | 251/197 |
| 2,217,959 | 10/1940 | Long | 251/168 X |

Primary Examiner—Harold W. Weakley
Attorney, Agent, or Firm—James W. Grace

[57] ABSTRACT

A parallel seat gate valve comprises two separate gates which are hung from the valve stem and raised or lowered by rotating the valve stem in opposite directions. Further, the gates are forced against parallel body seats by further rotation of the valve stem after the gates have reached their lowermost position, causing a compressive stress in a solid flowable material which is enclosed in a cavity formed between the two gates. Over stressing of the solid flowable material is prevented by metal to metal stops. The gates are allowed to unseal by rotating the valve stem in the opposite direction, thus removing the compressive stress from the solid flowable material, and are further opened by continued rotation of the stem.

8 Claims, 4 Drawing Figures

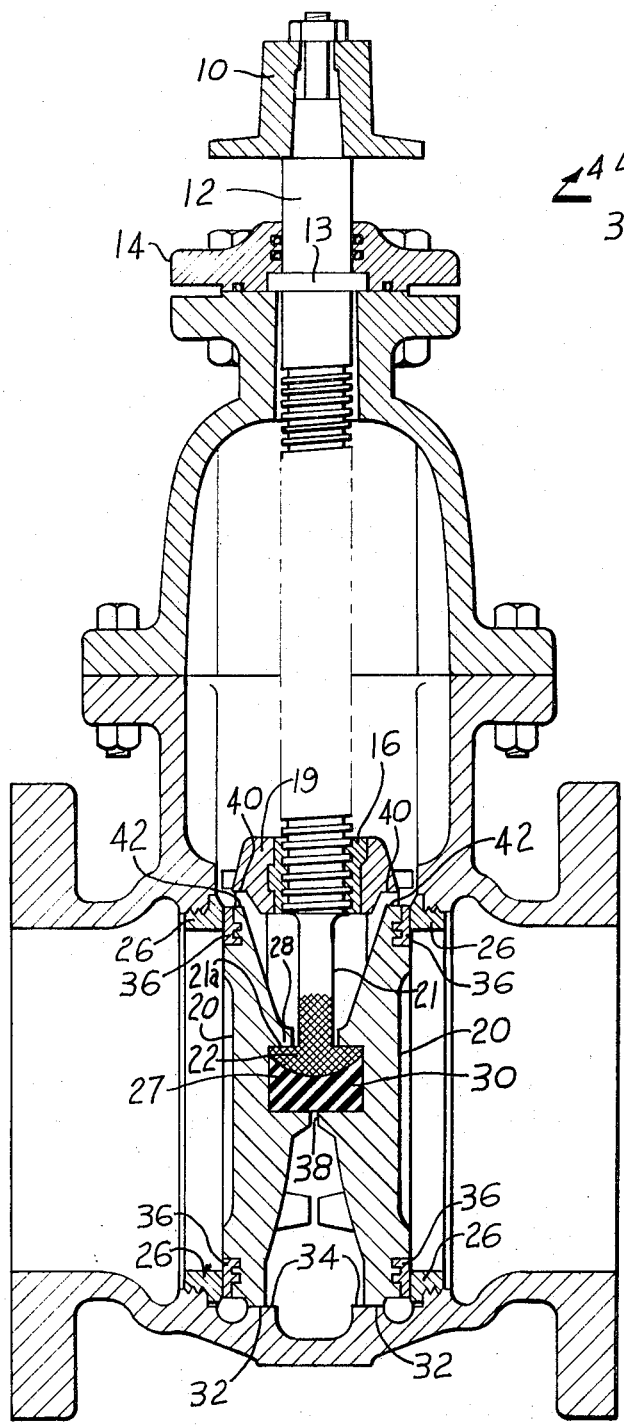
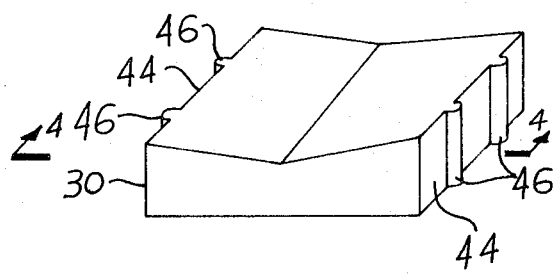
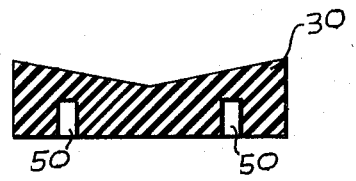

DOUBLE DISC GATE VALVE

BACKGROUND OF THE INVENTION

1. Field of the Invention

This invention pertains to gate valves and more particularly to double disc gate valves which are used in water distribution systems.

2. Description of the Prior Art

For many years gate valves with parallel body seats have had the gates forced against the body seats by utilizing a wedging action. A wedge is forced between the gates after they have been lowered into position. The gates, being furnished with an inclined surface for the wedge to engage, move apart as the wedge is forced between these inclined surfaces. The surfaces of necessity scrape together and such scraping results in wear and increases the torque required to close the valve. Parallel seat gate valves are used in municipal water systems where uninterrupted service is of extreme importance since removing a pipe line from service and opening the line creates both a safety and health hazard. Gate valves in water distribution systems are often buried several feet in the ground with very limited access to the operating nut or to some device attached to the operating nut. A person opening or closing such a valve cannot tell when the valve is fully opened or fully closed. Thus, it is quite common for a gross over-torque to be applied to the operating nut. This over-torque causes excessive stressing and wear of the wedge assemblies of wedge type gate valves. The parts receiving wear must, of course, eventually be replaced. Also since iron to iron in frictional engagement would have a tendency to gall and therefore increase the force required to move one over the other, one metal is used for the gates (usually iron) and another for the wedges (usually bronze).

There are known methods of sealing valve openings utilizing rubber or other solid flowable materials as the sealing medium and thus reducing the frictional engagement of metal to metal surfaces. Such a method is employed in the device described in U.S. Pat. No. 2,865,597 issued to Joseph E. Lucas. The Lucas patent, however, describes a wedge gate valve wherein the wedge gate seals against inclined seats sloped to correspond to the fixed shape of the gate. Also, the Lucas construction utilizes the solid flowable material primarily as a sealing surface.

The present invention is an improved device for use in a parallel seat gate valve for forcing the seats of individually suspended parallel gates against their corresponding body seats.

It is, therefore, an object of the present invention to furnish, in a gate valve, a novel gate actuating mechanism wherein the gates are forced against the body seats by the flow of a relatively solid flowable material in a confined space.

It is also an object of this invention to prevent overstressing of the solid flowable material.

It is a further object of this invention to reduce the number of frictionally wearing parts and also reduce the torque required to seal between the seats.

It is yet an additional object of this invention to replace the relatively expensive wedges, usually bronze, with a less expensive part of relatively solid flowable material.

Other objects and advantages will become evident from a consideration of the following description taken in conjunction with the accompanying drawings in which like numerals indicate like elements and in which:

FIG. 2 is a sectional view taken along the lines 2—2 in FIG. 1, and

FIG. 3 is a perspective view of the solid flowable material with a V-shaped upper surface.

FIG. 4 is a sectional view taken along the lines 4—4 of FIG. 3 with compression limiting pins added.

Figure 1:
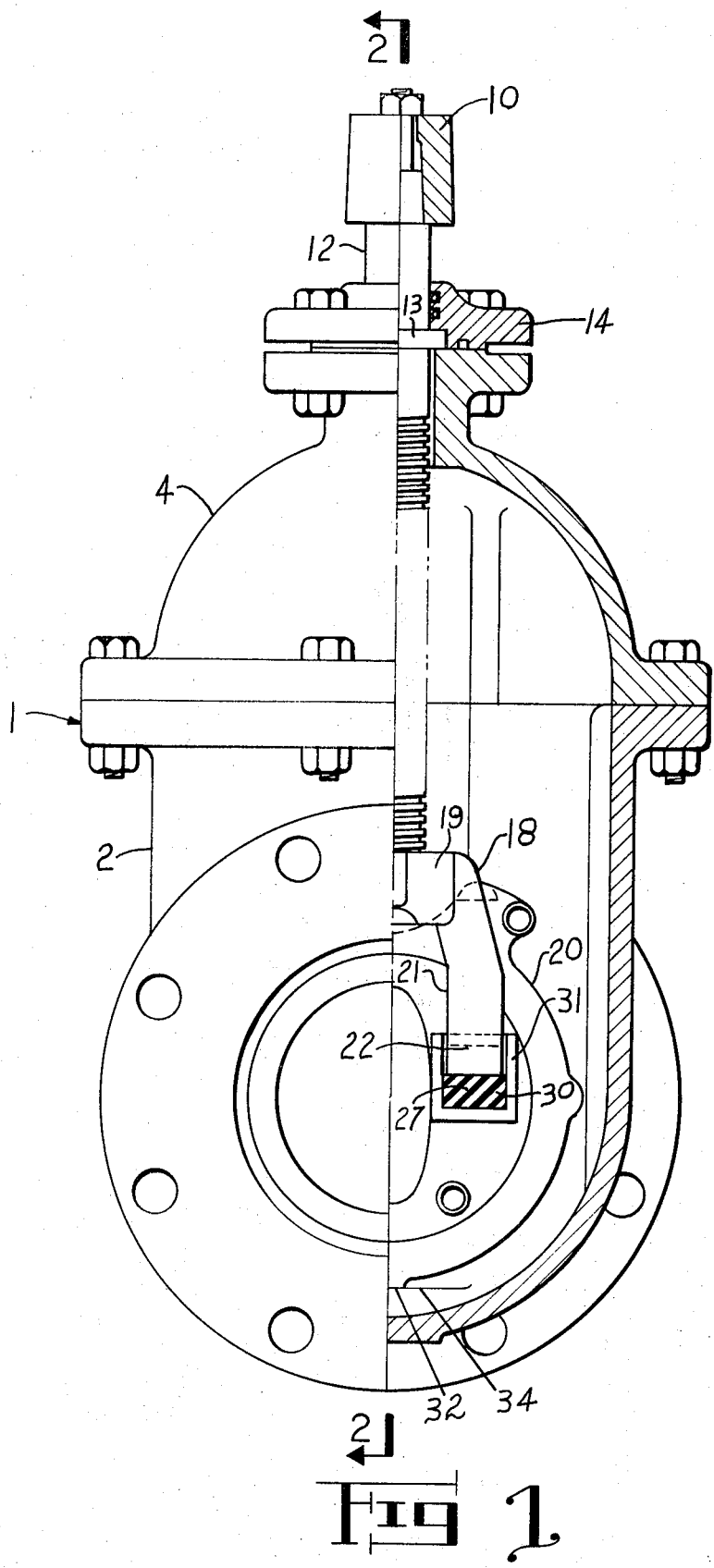
FIG. 1 is an end elevational view of the novel gate valve of the invention with partial sectional view of the gate valve.

Referring to FIG. 1, there is shown a gate valve 1 with a portion of the body 2, the bonnet 4 and one gate 20 removed to reveal part of the gate actuating mechanism. The gate actuating mechanism is also shown in FIG. 2 and may be better understood from the following description.

Operating nut 10 is connected to the upper end of threaded valve stem 12 which is guided by seal plate 14. Seal plate 14 encloses a shoulder 13 of valve stem 12 to prevent the valve stem from moving vertically. Valve stem 12 which extends downwardly from its connection with operating nut 10 threadedly rotates inside stem nut 16 which is fixedly attached to and forms the center part of the gate carrying yoke 18. Stem nut 16 has a female thread which coacts with the threads of stem 12.

As valve stem 12 is rotated in one direction, stem nut 16 rides upwardly over the threaded shaft of valve stem 12. When valve stem 12 is rotated in the opposite direction, stem nut 16 rides downwardly over the threaded shaft of valve stem 12.

Yoke 18 comprises a larger cylindrical ring 19 surrounding stem nut 16 and has two outwardly and downwardly extending fingers or tines 21 symmetrically located on opposite sides of ring 19. The lower end of each tine 21 is an enlarged section with an annular shoulder surrounding the central shaft of each tine 21 and extending outwardly therefrom. The lower end of each tine 21 forms a ram 22.

The bottom surface of each ram 22 is of a curved convex shape in cross-section, although it could be of V-shaped cross-section.

Disc gates 20 are removably suspended from shoulders 21a of tines 21 and rams 22. Rams 22 partially fill each of two cavities 27 formed in each of the two gates 20 by walls 31 and overhanging lip 28 of gate 20. The remainder of each cavity not filled by ram 22 is filled by a solid flowable material 30 such as rubber (more fully shown in FIG. 3.)

The rear faces of the gates 20 are located so that pairs of cavities 27 of each gate are opposite each other and in mating alignment. Thus, a cavity 27 in the right-hand plate of FIG. 1, is aligned with a corresponding cavity 27 in the left-hand plate of FIG. 1. In this way the rams 22 and the solid flowable materials 30 at each end of each of tines 21 lie in each of the two cavities facing each other in the rear surfaces of the plates.

For convenience the gates 20 have a gap 38 of between one thirty-second to one-sixteenth inch.

The solid flowable material 30 may be natural rubber, neoprene or of other synthetic rubber-like materials and should be between about 60 to 90 durometer but preferably between 70 and 80. Since the bottom surface of ram 22 is beveled or V-shaped, a corresponding cooperating bevel is provided on the top surface of the solid flowable material 30. Should the bottom surface of ram 22 be curved convex then the top surface of the solid flowable material should be curved concave to coengage with the ram 22. This configuration helps keep the application of force of ram 22 centrally between the gates and thus prevent eccentric loading with corresponding unequal forces. This is particularly important where the valve is located in a pipe line that is not horizontal or where the valve stem 12 is not vertical since the gates are individually suspended from yoke 18. There are also provided, on the end portions 44 of the solid flowable material 30, narrow protrusions or ribs 46, small in size compared to the surface area of the end portion. These protrusions 46 extend outwardly from the ends 44 sufficiently to cause the gates seats 26 to touch lightly against body seats 36 when ram 22 is not exerting a force against the solid flowable material 30. This provides a wiping action by the gate seats 36 as they move over the body seats 26, cleaning the body of any particle which might otherwise be trapped therebetween. It will be obvious to those skilled in the art that the protrusions 46 could be of other shapes and could also be positioned differently on the end portions 44 and yet accomplish the same purpose. Only a small area of material need protrude as it is desirable to have only a very light pressure exerted by the protrusions and certainly not enough pressure to cause appreciable wear. For valves up through twelve inches nominal diameter of opening, protrusions 46 preferrably protrude only one sixty-fourth inch and are only one-sixteenth inch wide. For larger valves we prefer to provide a protrusion of one thirty-second inch outwardly and one-eighth inch wide.

Operation of the Double Disc Gate Valve

Turning stem 12 in a certain direction will cause gates 20 to be lowered to the position shown in FIG. 2. This action occurs since stem nut 16 moves down the threads of stem 12 when stem 12 is rotated in said certain direction; stem nut 16 being incapable of rotation as it is fixed to yoke 18 which is in turn prevented from rotation by the fit of gates 20 inside body 2 and bonnet 4. The gates 20 will, of course, be raised by turning the stem 12 in the direction opposite to that which caused lowering. Once the gates 20 have been lowered to the point where their lower extremities 32 rest on down stops 34, continued rotation of stem 12 forces ram 22 against solid flowable material 30 which is virtually enclosed by walls 31 and gates 20. The solid flowable material 30 transmits a relatively equal pressure in all directions, thus causing gates 20 to be forced apart effecting a seal between body seats 26 and gate seats 36. It should be noted that such seal is effected with very little frictional contact. The only metal to metal frictional contact being between the threads and between the gate lower extremities 32 and the down stops 34. Also the possibility of overstressing the solid flowable material is prevented by having upper compression stop limits 40 on yoke 18 and lower compression stop limits 42 on gates 20. The importance of such compression stops is to prevent the solid flowable material 30 from being stressed beyond its elastic limit or extruded through the narrow openings between walls 31 of gates 20. When the direction of rotation of stem 12 is reversed, the compressive force on the solid flowable material 30 is released and the gates are allowed to unseal.

The opening 38 between the gates is, of course, greatest when the solid flowable material 30 is in compression, however, the material selected is such that it will not flow through this relatively small opening when upper stop limits 40 are pressed against lower stop limits 42.

With reference to the provision of lower stops 42 to prevent undue compression of the flowable material 30, an alternative structure comprising metal pins 50 may be inserted into the material 30. These pins will be of a length selected such that the downward stroke of stem 12, and thus ram 22, will be limited to a preset distance less than that at which the material 30 will be unduly extruded or compressed.

Tests have shown that the present invention effects a seal, when utilized in a 10 psi pipe line, at less than one-half the stem torque required by conventional parallel seat wedge gate valves. This low pressure sealing is significant since it is well known that above about 30 psi the fluid pressure against the down stream gate causes the gate to seal. The highest stem torque on parallel seat gate valves thus is required when shutting off flow in a relatively low pressure line where the upstream pressure is insufficient to cause the downstream gate to seal.

We claim:

1. A gate valve including, a body portion with body seats, a bonnet portion attached to said body portion, a threaded valve stem rotatably secured to said bonnet portion for raising and lowering said gates to preset stops, and a yoke having a central annular ring with female threads cooperatively engaged with the threads of said threaded valve stem and spaced fingers depending from said ring, wherein the improvement comprises;
   two gates each removably and individually suspended from said yoke;
   each gate having a rear surface and an outer face;
   said rear surfaces of said gates being spaced in close proximity to each other and having aligned mating cavities therein;
   a solid flowable material enclosed between said gates and partially filling said cavities;
   ram means formed onto the lower extremities of said yokes and filling the remainder of said cavities for compressing said solid flowable material when said gates are lowered onto said preset stops, whereby said gates are forced apart into fluid-tight engagement with said body seats.

2. The gate valve of claim 1 wherein said solid flowable material has flat planar top surfaces forming a V-shape and said ram means for compressing said solid flowable material has flat planar bottom surfaces forming a complementary V-shape.

3. The gate valve of claim 1 wherein said solid flowable material has a curved, concaved top surface and said ram means for compressing said solid flowable material has a curved convex bottom surface.

4. A gate valve of claim 1 wherein the means for compressing said solid flowable material includes upper compression stop limits on said yoke and a lower compression stop limit on each of said gates.

5. The gate valve of claim 1 in which said solid flowable material has metal pins of predetermined length inserted therein to limit the length of the downstroke of said valve stem.

6. The gate valve of claim 1 in which said solid flowable material is constructed of a material having a Shore A durometer hardness of between about 60 to 90.

7. The gate valve of claim 6 in which said solid flowable material is rubber.

8. A gate valve as recited in claim 1 in which each of said rams has an upper shoulder upon which each gate removably rests.

* * * * *